(12) United States Patent
Strong

(10) Patent No.: US 12,393,503 B2
(45) Date of Patent: Aug. 19, 2025

(54) PROCESSOR PERFORMANCE PROFILING USING TRACE ACTIONS

(71) Applicant: Rivos Inc., Mountain View, CA (US)

(72) Inventor: Beeman Connally Strong, Portland, OR (US)

(73) Assignee: Rivos Inc., Santa Clara, CA (US)

(*) Notice: Subject to any disclaimer, the term of this patent is extended or adjusted under 35 U.S.C. 154(b) by 442 days.

(21) Appl. No.: 18/065,543

(22) Filed: Dec. 13, 2022

(65) Prior Publication Data

US 2024/0193070 A1    Jun. 13, 2024

(51) Int. Cl.
     *G06F 9/44*          (2018.01)
     *G06F 9/30*          (2018.01)
     *G06F 11/34*        (2006.01)

(52) U.S. Cl.
     CPC ...... *G06F 11/3495* (2013.01); *G06F 9/30101* (2013.01)

(58) Field of Classification Search
     CPC .................................................. G06F 11/3495
     USPC ....................................................... 719/320
     See application file for complete search history.

(56) References Cited

U.S. PATENT DOCUMENTS

| | | | |
|---|---|---|---|
| 10,067,847 B1* | 9/2018 | Habusha | G06F 11/3466 |
| 10,114,729 B2* | 10/2018 | Baartmans | G06F 11/3409 |
| 10,216,616 B2* | 2/2019 | Strong | G06F 11/3636 |
| 2015/0143343 A1* | 5/2015 | Weiss | G01R 31/31705 |
| | | | 717/128 |
| 2021/0208990 A1* | 7/2021 | Yasin | G06F 11/3006 |

OTHER PUBLICATIONS

"ARM Architecture Reference Manual, Debug supplement," ARM Limited, 2006, 260 pages.
G. Panesar et al.: "Efficient Trace for RISC-V, Version 2.0," May 5, 2022, 117 pages.
T. Newsome et al.: "RISC-V External Debug Support Version 0.13.2," SiFive, Inc., Mar. 22, 2019, 94 pages.

* cited by examiner

*Primary Examiner* — Timothy A Mudrick
(74) *Attorney, Agent, or Firm* — Brake Hughes Bellermann LLP

(57) ABSTRACT

In a general aspect, a processor can include an instruction processing unit configured to execute a software program that includes a plurality of machine-readable instructions, and a hardware performance monitoring unit. The hardware performance monitoring unit can include a plurality of counters configured to count respective processing events associated with execution of the software program, and a counter overflow monitor configured to generate an indication of a respective counter-overflow trace action in response to overflow of a counter of the plurality of counters. The processor can also include a trace encoder configured to receive the indication of the respective counter-overflow trace action from the hardware performance monitoring unit, and, in response to the indication of the respective counter-overflow trace action, perform the respective counter-overflow trace action.

20 Claims, 6 Drawing Sheets

| COUNTER | EVENT DESCRIPTION |
|---|---|
| 0 | Mispredictions |
| 1 | Exceptions |
| 2 | Interrupts |
| 3 | CSR operations |
| 4 | Jumps |
| 5 | Branches |
| 6 | MUL/DIV operations |
| 7 | RAW stalls |
| 8 | Execution Unit stalls |
| 9 | Instruction cache accesses |
| 10 | Instruction cache misses |
| 11 | Instruction cache fill-buffer hits |
| 12 | Instruction cache non cacheable accesses |
| 13 | Instruction cache fill-buffer releases |
| 14 | Data cache read accesses |
| 15 | Data cache write accesses |
| 16 | Data cache atomic accesses |
| 17 | Data cache Non-cached read accesses |
| 18 | Data cache Non-cached write accesses |
| 19 | Data cache read misses |
| 20 | Data cache write misses |
| 21 | Data cache atomic misses |
| 22 | Data cache read fill-buffer hits |
| 23 | Data cache write fill-buffer hits |
| 24 | Data cache atomic fill-buffer hits |
| 25 | Data cache fill-buffer releases |
| 26 | Data cache line evictions |

FIG. 4

PROCESSOR PERFORMANCE PROFILING USING TRACE ACTIONS

TECHNICAL FIELD

This description relates to computer processing apparatuses, such as microprocessors, processors, central processing units, and the like. More specifically, this disclosure relates to computer processing apparatuses, and associated systems and methods for profiling performance of a processor using trace actions.

BACKGROUND

Analyzing performance and operation of processors and related systems, including execution of programs (e.g., software) on such processors and systems, is often carried out to understand, improve, and/or debug that performance and operation. For instance, processors, such as RISC-V® processors, x86 processors, ARM® processors, Power® processors, etc., can include circuitry (e.g., performance monitoring circuitry or hardware) that is used to collect information related to hardware performance when executing a software program. In a number of conventional approaches, collection of such performance information is accomplished using counters included in the performance monitoring hardware to statistically sample software execution. In such approaches, the performance monitoring hardware triggers an interrupt when a counter, counting occurrences of a respective type of processing event, overflows. An interrupt handler of the processor can then collect context information corresponding with execution of a software program. Such approaches, however, have a number of drawbacks. For instance, interrupt handling can adversely affect execution performance of the software program for which profiling information is being collected. Further, interrupts can be masked by software, which can interfere with, or prevent, collection of performance information, resulting in so-called profiling blind spots.

One approach that has been implemented to address the issue of profiling blind spots is to map performance counter overflow interrupts to non-maskable interrupts (NMIs). However, such approaches also have drawbacks. For instance, NMIs can be used to indicate a large number of different types of processing events. Accordingly, associated interrupt handling can be complex and operate slowly, e.g., relative to interrupt handling of maskable interrupts, which can further add to the performance impact associated with the use of interrupts for collecting performance monitoring information. Additionally, in some processor architectures. NMIs may only be handled in specific modes of operation, which can present complications, such as dependency on firmware, or privileged software to support sample collection.

Another approach that has been implemented for collecting profiling information is the use of hardware sampling mechanisms. In such approaches, a processor can include memory and/or registers that buffer (store) processor state information or other execution state information in response to performance counter overflows. In this approach, rather than an interrupt being issued each time a performance counter overflows, an interrupt can be issued when storage capacity for such state information is full, or nearly full, and the collected state information can then be written out to another, e.g., larger, memory storage area. While hardware sampling can address some of the drawbacks of interrupt based sampling, such approaches can require a substantial amount of circuitry, and can be complicated to implement, which can make them expensive from both design and product cost standpoints (e.g., due to their complexity and associated increased semiconductor die size). Further, hardware sampling can still have adverse impacts on execution performance of an associated software program. For instance, in some implementations, profiling information is stored to memory using shared memory bandwidth, which can adversely affect execution performance. Further, in some implementations, software execution is paused when collecting and/or storing profiling information.

SUMMARY

In a general aspect, the techniques described herein relate to a processor including an instruction processing unit configured to execute a software program that includes a plurality of machine-readable instructions, and a hardware performance monitoring unit. The hardware performance monitoring unit includes a plurality of counters configured to count respective processing events associated with execution of the software program, and a counter overflow monitor configured to generate an indication of a respective counter-overflow trace action in response to overflow of a counter of the plurality of counters. The processor also includes a trace encoder configured to receive the indication of the respective counter-overflow trace action from the hardware performance monitoring unit, and, in response to the indication of the respective counter-overflow trace action, perform the respective counter-overflow trace action.

Implementations can include one or more of the following features, or any combination thereof. For example, the respective counter-overflow trace action can include encoding a trace packet that includes an address of a machine-readable instruction of the plurality of machine-readable instructions. The address can correspond with the overflow of the counter of the plurality of counters.

The indication of the respective counter-overflow trace action can include an identifier of the counter of the plurality of counters. The trace packet can further include the identifier of the counter of the plurality of counters.

The respective counter-overflow trace action can include one of enabling the trace encoder, or disabling the trace encoder.

The processor can include a trigger block configured to administer a plurality of trigger conditions, and receive, from the instruction processing unit, address and data values associated with execution of the software program. The trigger block can be configured to compare the received address and data values with the plurality of trigger conditions. In response to a match between a given value of the received address and data values and a trigger condition of the plurality of trigger conditions, the trigger block can indicate a respective trigger trace action. The trace encoder can be configured to receive the indication of the respective trigger trace action, and, in response to the indication of the respective trigger trace action, perform the respective trigger trace action.

The respective trigger trace action can include encoding a trace packet including an address of a machine-readable instruction of the plurality of machine-readable instructions corresponding with the matched trigger condition.

The indication of the respective trigger trace action can include an identifier of the trigger condition of the plurality of trigger conditions. The trace packet can include the identifier of the trigger condition of the plurality of trigger conditions.

The respective counter-overflow trace action can be one of a trace enable action, a trace disable action, or a trace notify action. The respective trigger trace action can be one of the trace enable action, the trace disable action, or the trace notify action. The processor can include logic configured to combine indications of the trace enable action from the hardware performance monitoring unit with indications of the trace enable action from the trigger block, combine indications of the trace disable action from the hardware performance monitoring unit with indications of the trace disable action from the trigger block, and combine indications of the trace notify action from the hardware performance monitoring unit with indications of the trace notify action from the trigger block.

The received address and data values, e.g., received by the trigger block, can include at least one of an instruction address, a memory address, an instruction opcode, a data value stored by the processor, or a data value read by the processor.

The hardware performance monitoring unit can include a plurality of initialization registers respectively coupled with the plurality of counters. The plurality of initialization registers can be configured to load respective initialization values in the plurality of counters.

A counter of the plurality of counters can include a count value field, and an initialization value field. The counter can be configured to load an initialization value from the initialization value field into the count value field, e.g., upon counter overflow or other conditions.

In another general aspect, the techniques described herein relate to a processor including an instruction processing unit configured to execute a software program including a plurality of machine-readable instructions, a hardware performance monitoring unit configured to provide first trace action indication signals in response to overflow of counters configured to count processing events occurring during execution of the software program, a trigger block configured to provide second trace action indication signals in response to matching of trigger conditions during execution of the software program, combinational logic configured to respectively combine the first trace action indication signals with the second trace action indication signals to produce combined trace action indication signals, and a trace encoder. The trace encoder is configured to receive the combined trace action indication signals, and, in response to the combined trace action indication signals, perform respective trace actions.

Implementations can include one or more of the following features, or any combination thereof. For example, the respective trace actions can include enabling the trace encoder, encoding a trace packet including an address of a machine-readable instruction of the plurality of machine-readable instructions, and disabling the trace encoder.

The address of the machine-readable instruction of the plurality of machine-readable instructions can correspond with one of a counter overflow, or a matched trigger condition. The trace packet can include one of an indication of a counter that overflowed, or the matched trigger condition.

The trigger conditions can be based on address and data values associated with execution of the software program.

In another general aspect, the techniques described herein relate to a method of operating a processor. The method includes executing, by an instruction processing unit, a software program that includes a plurality of machine-readable instructions. The method also includes counting, by a hardware performance monitoring unit having a plurality of counters, respective processing events associated with execution of the software program, and indicating, by the hardware performance monitoring unit in response to overflow of a counter of the plurality of counters, a respective counter-overflow trace action. The method further includes receiving, by a trace encoder, the indication of the respective counter-overflow trace action from the hardware performance monitoring unit, and performing, by the trace encoder in response to the indication of the respective counter-overflow trace action, the respective counter-overflow trace action.

Implementations can include one or more of the following features, or any combination thereof. For example, the respective counter-overflow trace action can include encoding a trace packet including an address of a machine-readable instruction of the plurality of machine-readable instructions corresponding with the overflow of the counter of the plurality of counters.

The method can include administering, by a trigger block, a plurality of trigger conditions; receiving, by the trigger block from the instruction processing unit, address and data values associated with execution of the software program; comparing, by the trigger block, the received address and data values with the plurality of trigger conditions; indicating, by the trigger block in response to a match between a given value of the received address and data values and a trigger condition of the plurality of trigger conditions, a respective trigger trace action; receiving, by the trace encoder, the indication of the respective trigger trace action; and performing, by the trace encoder in response to the indication of the respective trigger trace action, the respective trigger trace action.

The respective trigger trace action can include encoding a trace packet including an address of a machine-readable instruction of the plurality of machine-readable instructions corresponding with the matched trigger condition.

BRIEF DESCRIPTION OF THE DRAWINGS

FIG. 4 is a table including example execution events that can be monitored (counted) by a hardware performance monitoring unit in a processor, such as in the examples of FIGS. 1 and 2.

Like reference symbols in the various drawings indicate like and/or similar elements.

DETAILED DESCRIPTION

This disclosure relates to computer processing apparatuses, such as processors, microprocessors, central processing units, graphics processing units, tensor processing units, and accelerators, etc. (hereafter "processor(s)"), and related systems and methods, that can overcome at least some of the drawbacks of prior approaches for obtaining profiling information by statistically sampling execution of a software program using trace encoder actions (trace actions). For instance, in implementations described herein, a processor includes a hardware performance monitoring unit (HPMU) that includes one or more counters configured to count respective processing events that occur during execution of a software program. In response to overflow of the counters, the HPMU provides indications of respective trace actions to a trace encoder. These trace actions, which can be referred to herein as counter-overflow trace actions, can be one of a trace enable action, a trace notify action, or a trace disable action. In some implementations, the HPMU can provide an indication of a respective trace action in response to a counter reaching a threshold value, rather than in response to counter overflow. In response to receiving an indication of a trace notify action, the trace encoder can be configured to generate a trace packet corresponding with the counter that overflowed, or reached a threshold value, where generated trace packets provide statistically sampled profiling information of execution of the software program.

Such approaches for statistically sampling software execution are accomplished without issuing interrupts in response to a counter of the HPMU overflowing or reaching a threshold value, or issuing interrupts in response to trigger conditions being matched. As generation of trace packets for statistical sampling can be done without interrupting, or stalling execution of a software program, as with interrupt-based sampling or hardware-based sampling, adverse impact of software execution can be reduced. As a result, sampling rates can be increased without resulting in a substantial impact to software execution performance, and/or sampling of every occurrence of rare processing events can be performed. In some implementations, there can be some processing overhead associated with copying trace packets from an internal, e.g., circular, storage buffer to external memory, or system memory, but that impact, for typical sampling rates, can be negligible as compared to prior approaches. Also, the approaches described herein support statistical sampling when interrupts are masked, which can avoid the occurrence of profiling blind spots.

Figure 1:
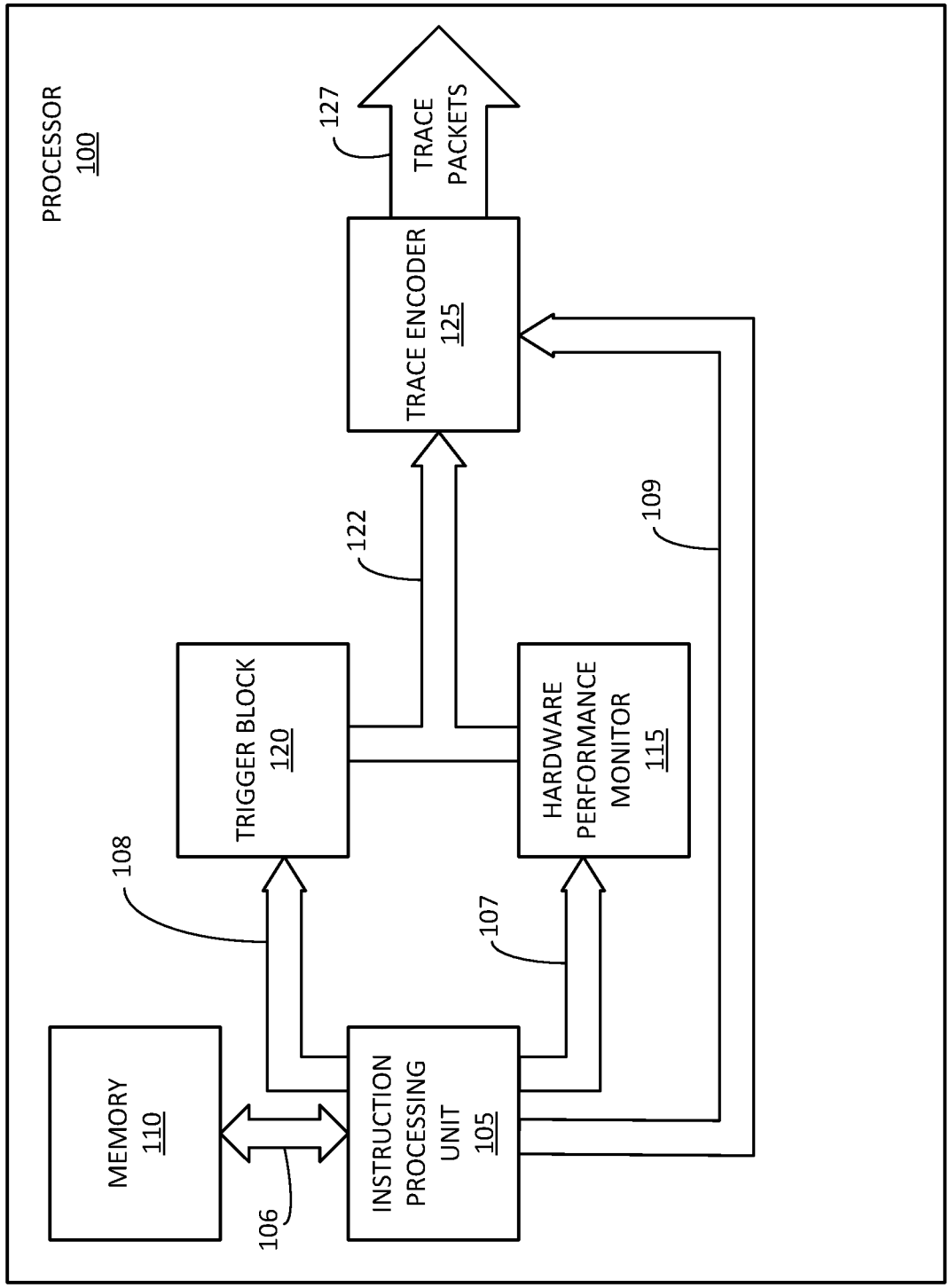
FIG. 1 is a block diagram illustrating an example processor.

FIG. 1 is a block diagram illustrating an example processor 100 that can perform statistical sampling of software execution using trace actions. As shown in FIG. 1, the processor 100 includes an instruction processing unit 105, memory 110, a HPMU 115 (hardware performance monitor), and a trace encoder 125. In the example of FIG. 1, the instruction processing unit 105 can communicate with the memory 110 via an interface 106. The memory 110 can include instruction memory, e.g., instruction cache, and data memory, e.g., data cache. In some implementations, the memory 110 can include other types of memory, such as read-only memory (ROM). The memory 110 can also include an interface to external memory, such as system memory (not shown in FIG. 1), or such a memory interface can be separately implemented. During execution of a software program including a plurality of machine-readable instructions, the instruction processing unit 105 can access the memory 110, via the interface 106, to fetch instructions of the software program for execution, read (load) data values related to execution from data memory, and write (store) data values related to execution to data memory.

As shown in FIG. 1, the instruction processing unit 105 can communicate with the HPMU 115 via an interface 107 and can communicate with the trigger block 120 via an interface 108. For instance, the instruction processing unit 105 can indicate occurrence of processing events during execution of the software program to the HPMU 115 via the interface 107. Further, the instruction processing unit 105 can provide, to the trigger block 120 via the interface 108, execution information, such as addresses of instructions accessed in the memory 110, opcodes of accessed instructions, memory addresses accessed in the memory 110, and/or data values read from, or written to the memory 110.

In this example, the HPMU 115 can include a plurality of counters that are configured to count respective processing events associated with execution of the software program, such as processing events indicated by the instruction processing unit 105. Examples of such processing events are shown in FIG. 4. The HPMU 115 can also include a counter overflow monitor (action processing block) that is configured to generate an indication of a respective counter-overflow trace action in response to overflow of a counter of the plurality of counters. As an example, a counter included in the HPMU 115 can be configured to count taken branches when executing a software program. The counter can be initialized such that it overflows after a desired number of branch-taken processing events occur. This overflow can be indicated to the counter overflow monitor, and the counter overflow monitor can then indicate a respective counter-overflow trace action to the trace encoder 125 via an interface 122.

In the processor 100, the trace encoder 125 can be configured to receive the indication of the respective counter-overflow trace action from the hardware performance monitoring unit. In response to the received indication of the respective counter-overflow trace action, the trace encoder 125 can then perform the respective counter-overflow trace action. The trace actions can be one of a trace start action, a trace notify action, and a trace stop action. The trace start action can enable the trace encoder 125 to generate trace packets. The trace stop action can disable the trace encoder 125, where the trace encoder 125 does not generate trace packets even though counter overflows may continue to occur.

The trace notify action can include the trace encoder 125 producing a trace packet that includes an instruction address (e.g., a program counter value, instruction pointer value, etc.) of an instruction associated with the counter overflow that resulted in the counter-overflow trace action indication. That instruction address can be a specific address of an instruction that resulted in the counter overflow, or can be an address of an instruction that executes in an execution cycle in which overflow of the counter occurs (e.g., that identifies a relevant section of code of the software program). In this example, the instruction address can be provided to the trace encoder 125 by the instruction processing unit 105 via an interface 109. The interface 109 can also be used to provide other execution context to the trace encoder 125 for inclusion in trace packets, such as execution times, register values, call-stack data, branch history, timestamp (in units of processor clock cycles, instructions retired, wall-clock time, etc.), or other information related to execution of a software program. In some implementations, instruction addresses and other execution context can be provided to the trace encoder 125 in other ways. For instance, such information can be included with indications of counter-overflow trace actions, e.g., provided to the HPMU 115 by the instruction processing unit 105, rather than via the interface 109.

The trace packet produced by the trace encoder 125 can be communicated via an interface 127 to a memory buffer, e.g., a trace buffer, such as an internal memory buffer of the processor 100 (not shown in FIG. 1). In some implementations, the trace buffer can be a circular buffer that wraps and overwrites when full. In example implementations, trace packets stored in such a trace buffer can be written out to external memory periodically, written out in response to a flush command, or written out as part of an interrupt routine, as some examples.

The trigger block 120 of the processor 100 can administer a number of triggers that can be used, in cooperation with the HPMU 115, to statistically sample software execution. The trigger block 120 can compare execution information received from the instruction processing unit 105 via the interface 108 and, if an item of execution information, e.g., an address, opcode or data value, is matched to a trigger condition, the trigger block 120 can indicate a respective trigger trace action assigned to that trigger condition. The available trace trigger actions can include the trace start action, the trace notify action, and the trace stop action, and are referred to as trace trigger actions to distinguish them from the indications of corresponding counter-overflow trace actions. The trigger trace actions can be performed by the trace encoder 125 in similar manners as the respective counter-overflow trace actions described above. In some implementations, other actions can be taken in response to a matched trigger condition, such as recording (saving, storing, etc.) last branch records or other information regarding execution state. The particular respective actions taken in response to trigger conditions being matched will depend on the specific implementation.

In the processor 100, the trace encoder 125 can be configured to receive the indication of the respective trigger trace action from the trigger block 120. In response to the received indication of the respective trigger trace action, the trace encoder 125 can then perform the respective trigger trace action. In some implementations, such as the example of FIG. 2, combinational logic can be used to combine indications of counter-overflow trace actions with their corresponding indications of trigger trace actions. That is, such combinational logic can produce combined trace action indications that are provided to the trace encoder 125, rather than providing separate indications from the HPMU 115 and the trigger block 120. For instance, indications of trace start actions can be combined, indications of trace notify actions can be combined, and indications of trace stop actions can be combined. Such combinational logic can be included in the interface 122.

Figure 2:
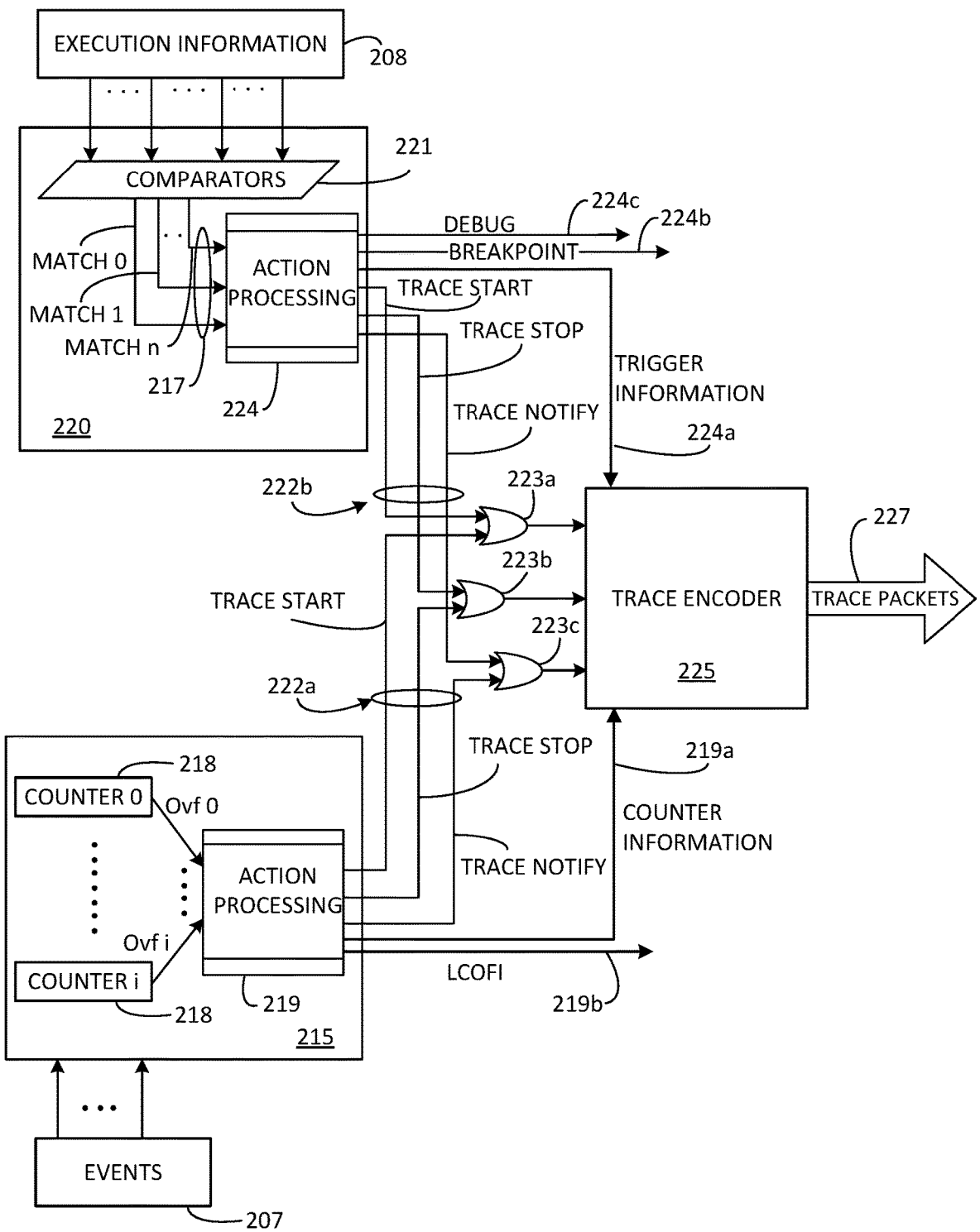
FIG. 2 is a block diagram illustrating an example of a sampling circuit including a hardware performance monitoring unit, a trigger block and a trace encoder that can be implemented in the processor of FIG. 1.

FIG. 2 is a block diagram illustrating an example of a sampling circuit 200 that includes a HPMU 215, a trigger block 220 and a trace encoder 225. In some implementations, the sampling circuit 200 can be implemented in the processor of FIG. 1. As shown in FIG. 2, events 207 (processing events) can be provided to the HPMU 215 from an instruction processing unit, such as the instruction processing unit 105. Also, execution information 208, e.g., addresses and data values, can be provided to the trigger block 220 by the instruction processing unit.

As shown in FIG. 2, the HPMU 215 includes counters 218 that are configured to respectively count processing events of the events 207. In the example of FIG. 2, the counters 218 are designated as Counter 0 to Counter i, where i is greater than or equal to 1. That is, if a processor includes 29 counters, i would be 28. The number of counters 218 will depend on the particular implementation.

In the HPMU 215, the counters 218 can provide respective overflow indications 216 (e.g., Ovf 0 to Ovf i) to an action processing block 219, where the action processing block 219 acts as a counter overflow monitor. In this example, the action processing block 219 can be configured to receive the respective overflow indications 216 and provide indications 222a of corresponding counter-overflow trace actions, e.g., trace start, trace notify, or trace stop. That is, each of the respective overflow indications 216 can have a specific trace action assigned, and the action processing block 219 can then provide the appropriate indication of the indications 222a based on those assignments. In some implementations, the relationships between counter overflows and respective trace actions can be included in a look-up table, an indexed list, or any other appropriate data structure.

As shown in FIG. 2, the action processing block 219 can also provide counter information to the trace encoder 225 via an interface 219a. For instance, for a given indication of a counter-overflow trace action, the action processing block 219 can provide an indication of the counter that overflowed to result in the given indication to the trace encoder 225. In some implementations, if the counter-overflow trace action is a trace notify action, the trace encoder 225 can be configured to include the respective counter information in a corresponding trace packet, along with an instruction address corresponding with the counter overflow, where the instruction address can be provided to the trace encoder 225 using the approaches described herein.

In addition to providing the indications 222a, the action processing block 219 can also be configured to provide a local counter overflow interrupt signal (a LCOFI signal 219b) in response to overflow of one or more of the counters 218. That is, overflow of one or more of the counters 218 can be associated with generation of an interrupt, rather than indicating a trace action via the indications 222a. Actions taken in response to the LCOFI signal 219b will depend on the particular implementation.

As shown in FIG. 2, the trigger block 220 includes comparators 221 that are configured to administer a plurality of trigger conditions. In the example of FIG. 2, the comparators 221 can compare execution information 208 provided by an instruction processing unit to the trigger conditions. Match indications 217 can be provided in response to the comparators 221 respectively matching an item of execution information to one of the plurality of trigger conditions. For instance, the trigger block 220 can administer 0 to n trigger conditions, where n is greater than or equal to 1, and the comparators 221 can respectively generate the match indications 217. That is, if n is 29, there would be 30 trigger conditions administered by the trigger block 220. The number of trigger conditions will depend on the particular implementation.

In the trigger block 220, the comparators 221 can provide match indications 217 (e.g., match 0 to match n) to an action processing block 224. In this example, the action processing block 224 can be configured to receive the match indications 217 and provide indications 222b of corresponding trigger trace actions, e.g., trace start, trace notify, or trace stop. That is, each of the match indications 217 can have a specific trace action assigned, and the action processing block 224 can then provide the appropriate indication of the indications 222b based on those assignments. In some implementations, the relationships between trigger condition matches and respective trigger trace actions can be included in a look-up table, an indexed list, or any other appropriate data structure.

As shown in FIG. 2, the action processing block 224 can also provide trigger information to the trace encoder 225 via an interface 224a. For example, for a given indication of a trigger condition match, the action processing block 224 can provide an indication of the trigger condition that was matched to result in the given indication to the trace encoder 225. In some implementations, if the trigger trace action is a trace notify action, the trace encoder 225 can be configured to include the associated trigger information in a corresponding trace packet, along with an instruction address corresponding with the counter overflow, where the instruction address can be provided to the trace encoder 225 using the approaches described herein.

In addition to providing the indications 222b, the action processing block 224 can also be configured to provide a breakpoint signal 224b or a debug signal 224c in response to the comparators 221 indicating a trigger condition match. That is, matching of one or more of the trigger conditions can be associated with generation of the breakpoint signal 224b, or generation of the debug signal 224c, rather than indicating a trace action via the indications 222a. Actions taken in response to the breakpoint signal 224b or the debug signal 224c will depend on the particular implementation.

In the sampling circuit 200, the indications 222a and the indications 222b can be respectively combined by combinational, e.g., OR logic or an OR logic gate. That is the trace start action indications from the HPMU 215 can be combined with trace start action indications from the trigger block 220 using OR logic 223a, trace stop action indications from the HPMU 215 can be combined with trace stop action indications from the trigger block 220 using OR logic 223b, and trace notify action indications from the HPMU 215 can be combined with trace start notify indications from the trigger block 220 using OR logic 223c.

In an example implementation, the sampling circuit 200 can be used to statistically sample software execution for a particular section of code of a software program as follows. In this example, a first trigger condition for a starting instruction address of the section of the code and a second trigger condition for an ending address of the section of the code can be administered by the trigger block 220. In this example, the first trigger condition can be associated with a trace start action, to start tracing at the beginning of the section of code. Also, in this example, the second trace condition can be associated with a trace stop action, to stop tracing after the section of code is executed, or exited. That is, the starting and ending addresses can define an instruction address range during which tracing is performed.

When executing the section of code, a counter of the counters 218 in the HPMU 215 can be configured to count processing events of interest and, on overflow of the counter, indicate a trace notify action to cause the trace encoder 225 to encode a trace packet. Depending on the particular implementation, the counter can be configured to overflow on every occurrence of a specific processing event, or configured to overflow after occurrence of a specific number of occurrences of the specific processing event. The number of event occurrences that will result in overflow of the counter can be established based on an initialization value of the counter. For instance, if overflow is desired for every occurrence of a processing event being counted, the counter can be initialized with a value that is one count away from (one less than) its overflow value. If overflow is desired after occurrence of a specific number of occurrences of a processing event, the counter can be initialized with a value that is less than its overflow value by that specific number.

In another example, the sampling circuit 200 can be used to statistically sample events during execution of software without the use of trigger conditions administered by the trigger block 220. For instance, multiple counters of the counters 218 can be configured to count occurrences of a specific processing event. Each of the counters can be initialized with different values, such that they overflow at different counts. For example, if branch mispredictions are being sampled, a first counter can be configured to overflow at first value, e.g., to overflow after 1000 branch mispredictions. Overflow of the first counter could then result in a trace start action, to enable the trace encoder 225 to generate trace packets. A second counter could be configured to overflow every 10 branch mispredictions, and result in a trace notify action and generation of a trace packet. A third counter could be configured to overflow after 1500 branch mispredictions have occurred, and result in a trace stop action. Accordingly, in this example, 50 branch mispredictions would be sampled, and 50 corresponding trace packets would be produced by the trace encoder 225.

Figure 3A:
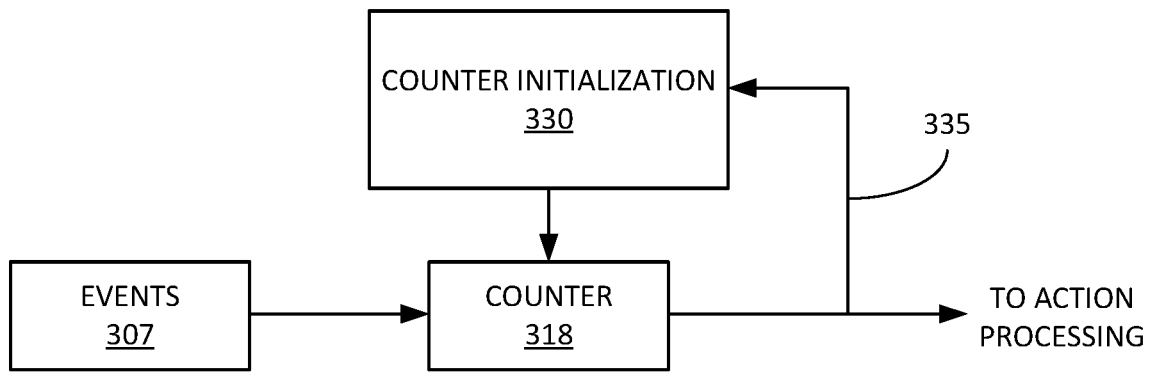
FIGS. 3A and 3B are block diagrams illustrating examples for initializing processing event counters, such processing event counters of FIG. 2.
Figure 3B:
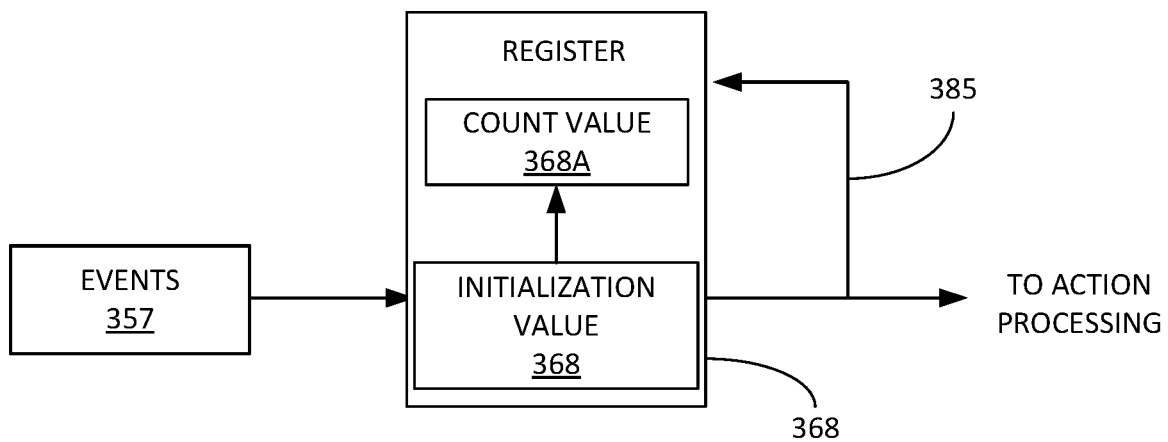

FIGS. 3A and 3B are block diagrams illustrating example approaches for initializing processing event counters, such as the counters 218 of FIG. 2. In the example of FIG. 3A, a counter 318 can be configured to count occurrences of a specific processing event (events 307). The counter 318 can be initialized with a counter initialization register 330. In this example, overflow of the counter 318 indicated on signal line 335 can cause the counter initialization register 330 to load the initialization value into the counter 318. In some implementations, loading of the counter initialization value from the counter initialization register 330 can be accomplished in other ways, such as in response to overflow of other counters included in a HPMU. In some implementations, the counter 318 and the counter initialization register 330 can be implemented using control/status registers (also referred to as CSRs).

In the example of FIG. 3B, a register 368, e.g., a control/status register, can be used to implement both a count value 368a (counter value) and an initialization value 380, e.g., as fields of the register 368. The count value 368a can be initialized with the initialization value 380. In this example, overflow of the count value 368a indicated on signal line 385 can cause the initialization value 380 to be loaded into the register field containing the count value 368a. In some implementations, initializing the count value 368a with the initialization value 380 from the can be accomplished in other ways, such as in response to overflow of other counters (or count values of other registers) included in a HPMU.

FIG. 4 is a table 400 including example execution events that can be monitored (counted) by a hardware performance monitoring unit in a processor, such as in the examples of FIGS. 1 and 2. The processing events shown in the table 400 are given by way of example, and the events that are counted will depend on the specific implementation. For instance, in some implementations, multiple counters that are initialized with different values can count occurrences of the same processing event (e.g., branch), and their respective overflow can initiate different trace actions. Further, in the table 400, number designations of counters for counting different processing events are shown by way of example. In some implementations, the order of counters and/or the order of associated processing events counted by a specific counter can be different. In some implementations, event counters can be configured (e.g., by an associated software program) to count occurrences of a specific processing event.

The example processing events listed in table 400, which can be implemented, e.g., in a given processor architecture, include branch mispredictions (counter 0), exceptions (counter 1), interrupts (counter 2), control/status register (CSR) operations (counter 3), jumps (counter 4), branches (counter 5), multiply and divide operations (counter 6), read-after-write (RAW) stalls (counter 7), execution unit (instruction processing unit) stalls (counter 8), instruction cache accesses (counter 9), instruction cache misses (counter 10), instruction cache fill-buffer hits (counter 11), instruction cache non-cacheable accesses (counter 12), instruction cache fill-buffer releases (counter 13), data cache read accesses (counter 14), data cache write accesses (counter 15), data cache atomic accesses (counter 16), data cache non-cached read accesses (counter 17), data cache non-cached write accesses (counter 18), data cache read misses (counter 19), data cache write misses (counter 20), data cache atomic misses (counter 21), data cache read fill-buffer hits (counter 22), data cache write fill-buffer hits (counter 23), data cache atomic fill-buffer hits (counter 24), data cache fill-buffer releases (counter 25), and data cache line evictions (counter 26). In some implementations, additional or fewer event counters can be included in a processor. That is, additional processing events can be counted, and/or counting of one or more processing events can be omitted. For instance, a processor can include a number of programmable counters (e.g., four to eight programmable counters), which can be respectively configured to count specific events.

Figure 5:
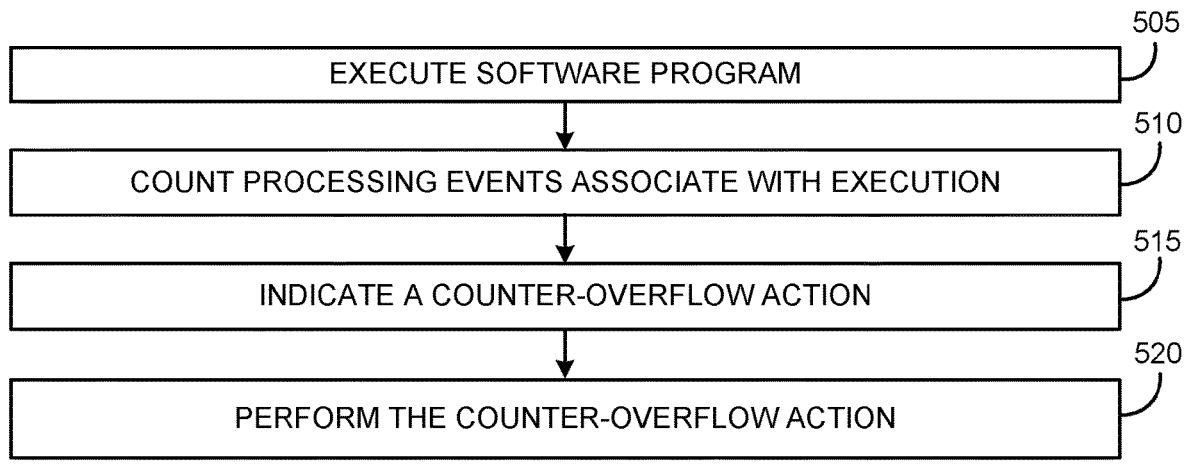
FIG. 5 is a flowchart illustrating a method for operating a processor, such as the processor of FIG. 1.

FIG. 5 is a flowchart illustrating a method 500 for operating a processor, such as the processor 100 of FIG. 1. In some implementations, the method 500 can be implemented using the techniques described herein. Accordingly, for purposes of illustration, and by way of example, the method 500 is described with further reference to, at least, FIGS. 1, 2 and 4. In some implementations, the method 500 can be implemented in processors having different architectures than those described herein.

As shown in FIG. 5, at block 505, the method 500 includes executing a software program with the instruction processing unit 105 of the processor 100, where the software program can include a plurality of machine-readable instructions. At block 510, the method 500 includes counting respective processing events, e.g., with the counters 218 of the HPMU 215 of FIG. 2 (or event counters included in the HPMU 115. For instance, processing events such as the example processing events shown in table 400 of FIG. 4 can be counted by the counters 218.

At block 515, the method 500 includes indicating a counter-overflow action in response to overflow of a counter of the counters 218. The counter-overflow action indication will depend on which of the counters 218 overflows. For instance, for a given counter of the counters 218, an associated counter-overflow action can include a trace action and/or an interrupt action (e.g., an LCOFI action). In some instances, overflow of a given counter could result in neither a trace action or an interrupt action occurring. In an example implementation, one or more of the counters 218 can each be associated with a respective trace action, such as a trace enable (trace start) action, a trace notify (encode trace packet) action, or a trace disable (trace stop) action, one or more of the counters 218 can be associated with an interrupt action, and/or one or more of the counters can be unassociated with a trace action or an interrupt action.

At block 520, the method includes the trace encoder 225 (or the trace encoder 125) performing the indicated trace action, e.g., in response to receiving the indication of the desired action corresponding with the counter overflow. In the method 500, if the indicated counter-overflow action is a trace notify action including encoding a trace packet, the trace packet can include an address of an instruction corresponding with overflow of the counter for which the trace action indication was generated. The instruction address can be a specific address of an instruction that resulted in the counter overflow, or can be an address of an instruction that executes in an execution cycle in which overflow of the counter occurs (e.g., identifies a relevant section of code of the software program). In some implementations, a trace packet is encoded in response to a trace notify action, e.g., in response to a counter overflow, can also include an indication of the counter that overflowed to initiate the trace notify action.

Figure 6:
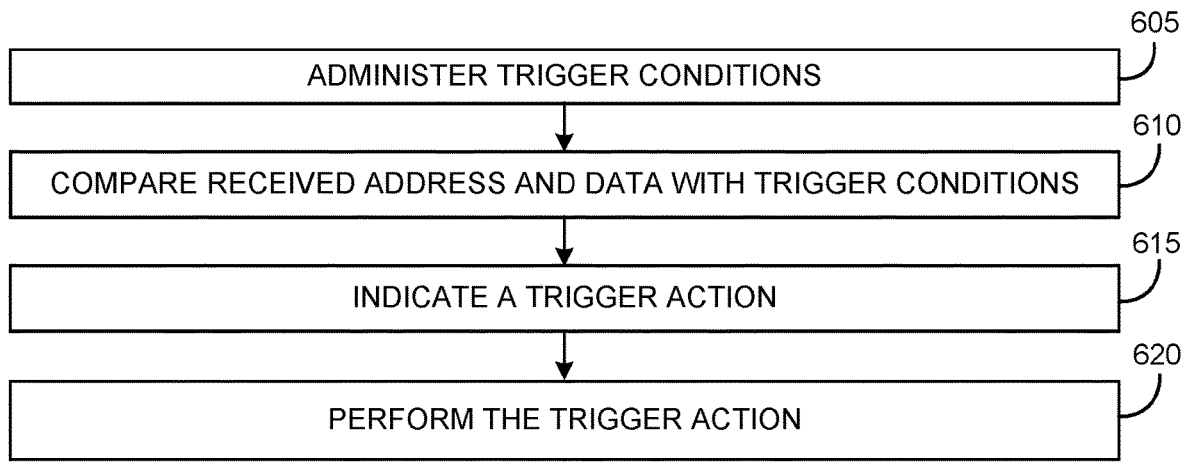
FIG. 6 is a flowchart illustrating a method for operating a processor, such as the processor of FIG. 1, that can be implemented in conjunction with the method of FIG. 5.

FIG. 6 is a flowchart illustrating a method 600 for operating a processor, such as the processor 100 of FIG. 1. In some implementations, the method 600 can be implemented in conjunction with the method 500 of FIG. 5. In some implementations, as with the method 500, the method 600 can be implemented using the techniques described herein. Accordingly, for purposes of illustration, and by way of example, the method 600 is described with further reference to, at least, FIGS. 1 and 2. In some implementations, the method 600 can be implemented in processors having different architectures than those described, herein.

As shown in FIG. 6, at block 605, the method 600 includes administering, by the trigger block 220 (or the trigger block 120), a plurality of trigger conditions (e.g., watchpoints). For instance, the trigger conditions can include trigger conditions that are based on specific instruction addresses, memory addresses, instruction opcode data values (e.g., specific instructions), and/or specific data values, such as data values that the processor 100 may store in, or read from memory 110. At block 610, the trigger block 120 (of the trigger block 220) can then receive addresses and data values, which can be referred to as execution information or execution information items, from the instruction processing unit 105 during execution of the software program. Also at block 610, the trigger block 220 can compare the received execution information items with the plurality of trigger conditions.

At block 615, if a specific execution information item received by the trigger block 220 matches one of the plurality of trigger conditions administered by the trigger block 220, the method 600 includes indicating a respective trigger action. As with indications of counter-overflow actions, the trigger action indication will depend on which trigger condition, or trigger conditions of the plurality of trigger conditions matched. For instance, for a given trigger condition, an associated trigger action can include a trace action, a breakpoint exception, and/or result in entry into a debug mode. That is, one or more trigger conditions of the plurality of trigger conditions can be associated with a respective trace action, such as a trace enable (trace start) action, a trace notify (encode trace packet) action, or a trace disable (trace stop) action. One or more trigger conditions of the plurality of trigger conditions can be associated with a breakpoint exception, and one or more trigger conditions can be associated with entry into a debug mode. Further in some implementations, one or more trigger conditions of the plurality of trigger conditions can be unassociated with a trace action, a breakpoint exception, or entry into a debug mode.

At block 620, the method includes the trace encoder 225 (or the trace encoder 125) performing the indicated trigger action, e.g., in response to receiving the indication of the desired trace action corresponding with the matched trigger condition. In the event multiple triggers are matched, a set of priorities can be applied as to which respective trigger action is performed. In the method 600, as with the method 500, if the indicated trigger trace action is a trace notify action including encoding a trace packet, the trace packet can include an address of an instruction corresponding with, or associated with the trigger condition match for which the trace action indication was generated. The instruction address can be a specific address of an instruction that resulted in the matched trigger condition, or can be an address of an instruction that executes in an execution cycle in which matching of the trigger condition occurs (e.g., identifies a relevant section of code of the software program). In some implementations, a trace packet that is encoded in response to a trace notify action, e.g., in response to a matched trigger condition, can also include an indication of the trigger condition that matched to initiate the trace notify action.

Figure 7:
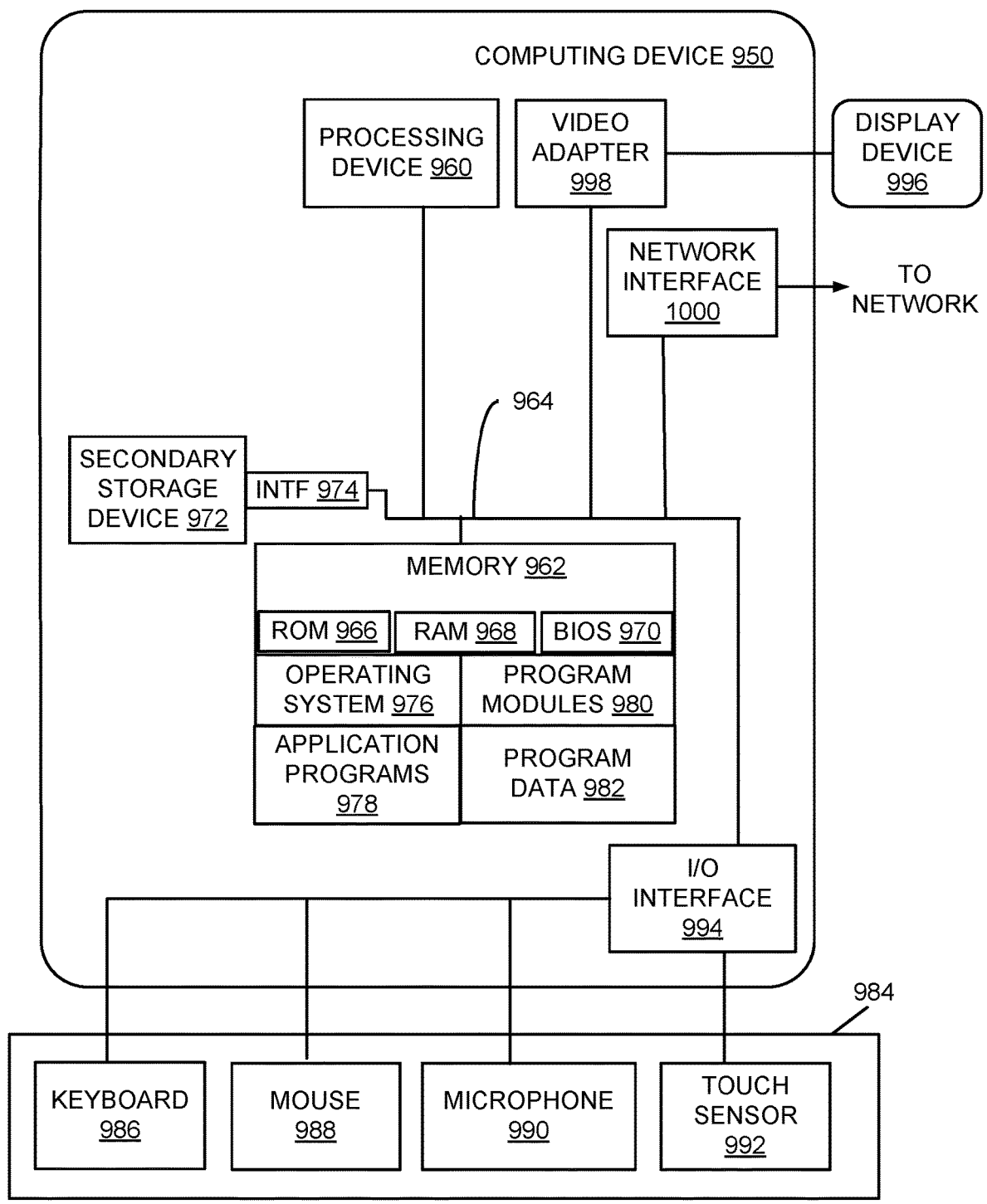
FIG. 7 is a diagram illustrating an example architecture of a computing device, which can be used to implement aspects according to the present disclosure.

FIG. 7 illustrates an example architecture of a computing device 750 that can be used to implement aspects of the present disclosure, including any of the plurality of computing devices described herein, such as a computing device including the processor 100, or any other computing devices that may be utilized in the various possible embodiments. The computing device illustrated in FIG. 7 can be used to execute an operating system, application programs and software modules, such as described herein.

The computing device 750 includes, in some embodiments, at least one processing device 760, such as a central processing unit (CPU). A variety of processing devices are available from a variety of manufacturers, for example, Intel or Advanced Micro Devices. In this example, the computing device 750 also includes a system memory 762, and a system bus 764 that couples various system components including the system memory 762 to the processing device 760. The system bus 764 is one of any number of types of bus structures including a memory bus, or memory controller; a peripheral bus; and a local bus using any of a variety of bus architectures.

Examples of computing devices suitable for the computing device 750 include a desktop computer, a laptop computer, a tablet computer, a mobile computing device (such as a smart phone, an iPod® or iPad® mobile digital device, or other mobile devices), or other devices configured to process digital instructions.

The system memory 762 includes read only memory 766 and random access memory 768. A basic input/output system 770 containing the basic routines that act to transfer information within computing device 750, such as during start up, is typically stored in the read only memory 766.

The computing device 750 also includes a secondary storage device 772 in some embodiments, such as a hard disk drive, for storing digital data. The secondary storage device 772 is connected to the system bus 764 by a secondary storage interface 774. The secondary storage devices 772 and their associated computer readable media provide nonvolatile storage of computer readable instructions (including application programs and program modules), data structures, and other data for the computing device 750.

Although the example environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory computer-readable media. Additionally, such computer readable storage media can include local storage or cloud-based storage.

A number of program modules can be stored in secondary storage device 772 or system memory 762, including an operating system 776, one or more application programs 778, other program modules 780 (such as the software engines described herein), and program data 782. The computing device 750 can utilize any suitable operating system, such as Microsoft Windows™, Google Chrome™ OS or Android, Apple OS, Unix, or Linux and variants and any other operating system suitable for a computing device. Other examples can include Microsoft, Google, or Apple operating systems, or any other suitable operating system used in tablet computing devices.

In some embodiments, a user provides inputs to the computing device 750 through one or more input devices 784. Examples of input devices 784 include a keyboard 786, mouse 788, microphone 790, and touch sensor 792 (such as a touchpad or touch sensitive display). Other embodiments include other input devices 784. The input devices are often connected to the processing device 760 through an input/output interface 794 that is coupled to the system bus 764. These input devices 784 can be connected by any number of input/output interfaces, such as a parallel port, serial port, game port, or a universal serial bus. Wireless communication between input devices and the interface 794 is possible as well, and includes infrared, BLUETOOTH® wireless technology, 802.11a/b/g/n, cellular, ultra-wideband (UWB), ZigBee, or other radio frequency communication systems in some possible embodiments.

In this example embodiment, a display device 796, such as a monitor, liquid crystal display device, projector, or touch sensitive display device, is also connected to the system bus 764 via an interface, such as a video adapter 798. In addition to the display device 796, the computing device 750 can include various other peripheral devices (not shown), such as speakers or a printer.

When used in a local area networking environment or a wide area networking environment (such as the Internet), the computing device 750 is typically connected to the network through a network interface 1000, such as an Ethernet interface or WiFi interface. Other possible embodiments use other communication devices. For example, some embodiments of the computing device 750 include a modem for communicating across the network.

The computing device 750 typically includes at least some form of computer readable media. Computer readable media includes any available media that can be accessed by the computing device 750. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 750.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 7 is also an example of programmable electronics, which may include one or more such computing devices, and when multiple computing devices are included, such computing devices can be coupled together with a suitable data communication network so as to collectively perform the various functions, methods, or operations disclosed herein.

What is claimed is:

1. A processor comprising:
an instruction processing unit configured to execute a software program including a plurality of machine-readable instructions;
a hardware performance monitoring unit, the hardware performance monitoring unit including:
a plurality of counters configured to count respective processing events associated with execution of the software program, and
a counter overflow monitor configured to generate an indication of a respective counter-overflow trace action in response to overflow of a counter of the plurality of counters; and
a trace encoder configured to:
receive the indication of the respective counter-overflow trace action from the hardware performance monitoring unit, and
in response to the indication of the respective counter-overflow trace action, perform the respective counter-overflow trace action.

2. The processor of claim 1, wherein the respective counter-overflow trace action includes encoding a trace packet that includes an address of a machine-readable instruction of the plurality of machine-readable instructions, wherein the address corresponds with the overflow of the counter of the plurality of counters.

3. The processor of claim 2, wherein:
the indication of the respective counter-overflow trace action includes an identifier of the counter of the plurality of counters, and
the trace packet further includes the identifier of the counter of the plurality of counters.

4. The processor of claim 1, wherein the respective counter-overflow trace action includes one of:
enabling the trace encoder, or
disabling the trace encoder.

5. The processor of claim 1, further comprising a trigger block configured to:
administer a plurality of trigger conditions,
receive, from the instruction processing unit, address and data values associated with execution of the software program,
compare the received address and data values with the plurality of trigger conditions, and
in response to a match between a given value of the received address and data values and a trigger condition of the plurality of trigger conditions, indicate a respective trigger trace action,
the trace encoder being further configured to:
receive the indication of the respective trigger trace action, and
in response to the indication of the respective trigger trace action, perform the respective trigger trace action.

6. The processor of claim 5, wherein the respective trigger trace action includes encoding a trace packet including an address of a machine-readable instruction of the plurality of machine-readable instructions corresponding with the matched trigger condition.

7. The processor of claim 6, wherein:
the indication of the respective trigger trace action includes an identifier of the trigger condition of the plurality of trigger conditions, and
the trace packet further includes the identifier of the trigger condition of the plurality of trigger conditions.

8. The processor of claim 5, wherein:
the respective counter-overflow trace action is one of:
a trace enable action,
a trace disable action, or
a trace notify action,
the respective trigger trace action is one of:
the trace enable action,
the trace disable action, or
the trace notify action,
the processor further comprising logic configured to:
combine indications of the trace enable action from the hardware performance monitoring unit with indications of the trace enable action from the trigger block,
combine indications of the trace disable action from the hardware performance monitoring unit with indications of the trace disable action from the trigger block, and
combine indications of the trace notify action from the hardware performance monitoring unit with indications of the trace notify action from the trigger block.

9. The processor of claim 5, wherein the received address and data values include at least one of:
an instruction address,
a memory address,
an instruction opcode,
a data value stored by the processor, or
a data value read by the processor.

10. The processor of claim 1, wherein the hardware performance monitoring unit further includes a plurality of initialization registers respectively coupled with the plurality of counters, the plurality of initialization registers being configured to load respective initialization values in the plurality of counters.

11. The processor of claim 1, wherein a counter of the plurality of counters includes:
a count value field, and
an initialization value field,
the counter being configured to load an initialization value from the initialization value field into the count value field.

12. A processor comprising:
an instruction processing unit configured to execute a software program including a plurality of machine-readable instructions;
a hardware performance monitoring unit configured to provide first trace action indication signals in response to overflow of counters configured to count processing events occurring during execution of the software program;
a trigger block configured to provide second trace action indication signals in response to matching of trigger conditions during execution of the software program;

combinational logic configured to respectively combine the first trace action indication signals with the second trace action indication signals to produce combined trace action indication signals; and a trace encoder configured to:
receive the combined trace action indication signals, and
in response to the combined trace action indication signals, perform respective trace actions.

13. The processor of claim 12, wherein the respective trace actions include:
enabling the trace encoder,
encoding a trace packet including an address of a machine-readable instruction of the plurality of machine-readable instructions, and
disabling the trace encoder.

14. The processor of claim 13, wherein the address of the machine-readable instruction of the plurality of machine-readable instructions corresponds with one of:
a counter overflow, or
a matched trigger condition.

15. The processor of claim 14, wherein the trace packet includes one of:
an indication of a counter that overflowed, or
the matched trigger condition.

16. The processor of claim 12, wherein the trigger conditions are based on address and data values associated with execution of the software program.

17. A method of operating a processor, the method comprising:
executing, by an instruction processing unit, a software program that includes a plurality of machine-readable instructions;
counting, by a hardware performance monitoring unit having a plurality of counters, respective processing events associated with execution of the software program;
indicating, by the hardware performance monitoring unit in response to overflow of a counter of the plurality of counters, a respective counter-overflow trace action; and
receiving, by a trace encoder, the indication of the respective counter-overflow trace action from the hardware performance monitoring unit; and
performing, by the trace encoder in response to the indication of the respective counter-overflow trace action, the respective counter-overflow trace action.

18. The method of claim 17, wherein the respective counter-overflow trace action includes encoding a trace packet including an address of a machine-readable instruction of the plurality of machine-readable instructions corresponding with the overflow of the counter of the plurality of counters.

19. The method of claim 17, further comprising:
administering, by a trigger block, a plurality of trigger conditions;
receiving, by the trigger block from the instruction processing unit, address and data values associated with execution of the software program;
comparing, by the trigger block, the received address and data values with the plurality of trigger conditions;
indicating, by the trigger block in response to a match between a given value of the received address and data values and a trigger condition of the plurality of trigger conditions, a respective trigger trace action;
receiving, by the trace encoder, the indication of the respective trigger trace action; and
performing, by the trace encoder in response to the indication of the respective trigger trace action, the respective trigger trace action.

20. The method of claim 19, wherein the respective trigger trace action includes encoding a trace packet including an address of a machine-readable instruction of the plurality of machine-readable instructions corresponding with the matched trigger condition.

* * * * *